G. WIRRER.
GEAR TESTING MACHINE.
APPLICATION FILED AUG. 30, 1917.

1,282,348.

Patented Oct. 22, 1918.
2 SHEETS—SHEET 1.

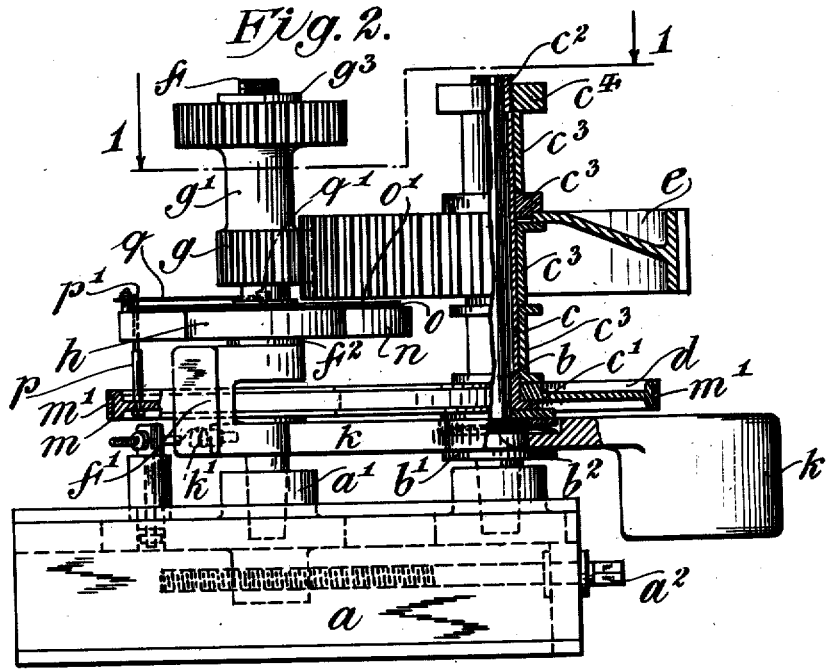
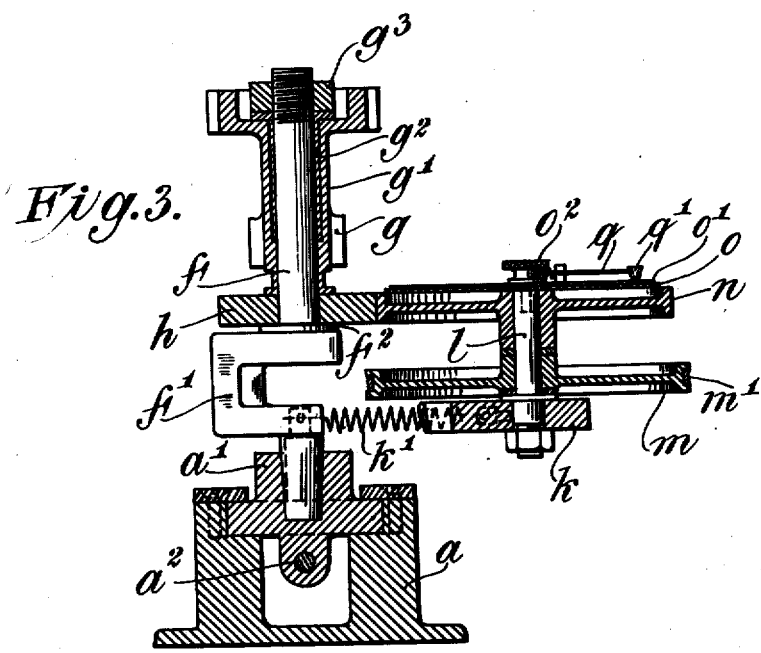

UNITED STATES PATENT OFFICE.

GOTTFRIED WIRRER, OF PHILADELPHIA, PENNSYLVANIA.

GEAR-TESTING MACHINE.

1,282,348. Specification of Letters Patent. Patented Oct. 22, 1918.

Application filed August 30, 1917. Serial No. 188,903.

*To all whom it may concern:*

Be it known that I, GOTTFRIED WIRRER, a citizen of the Swiss Republic, and residing in the city of Plainfield, in the State of New Jersey, have invented certain new and useful Improvements in Gear-Testing Machines, of which the following is a specification, reference being had to the accompanying drawing, forming a part hereof.

The purpose of this invention is to produce a machine which shall be capable of indicating and making a record of imperfections or inaccuracies, particularly in the involute of each tooth, of a pair of intermeshing gears as they come from the gear-cutting machine, so that the errors or defects in the gear cutting machine may be remedied and the gears thereafter cut therewith be free from the indicated and recorded errors or defects. The principle upon which depends the operation of the gear-testing machine which forms the subject of this invention is the comparison of the rolling action of a pair of intermeshing gears with the rolling action of two circular disks. If the rolling action of two perfectly accurate intermeshing gears should be compared by suitable mechanism with the rolling action of two perfectly true disks in contact the result indicated and shown on the record would be a vertically smooth and continuous circular or spiral line traced by the recording stylus. Any variation from correct form of any tooth of the gears would then be indicated by a temporary departure of the stylus from such a smooth and continuous line. This is in general the mode of operation of the present machine and the invention consists in improved mechanical devices whereby such a result is secured. It is possible in this machine to use, for purposes of comparison, not merely disks with diameters which correspond to the diameters of the gears to be tested, but disks which correspond in ratio to the ratio of the gears tested, so that, within reasonable limits, gears of different pitch diameters but of the same ratio may be tested upon the same machine without requiring the disks which furnish the standard of comparison to be changed. In the improved machine a stylus, carried by one rotating member which is driven in harmony with one of the gears of the pair of intermeshing gears to be tested, traces a line, either circular or spiral, upon a stationary record sheet. The arm which supports the stylus is influenced by another rotating member which is driven in general harmony with the other gear of the pair of intermeshing gears, but through a pair of friction disks of the same (inverse) ratio as the gears. If both gears are perfect, the path traced by the stylus upon the record sheet will be smooth and continuous, being circular if the speed of rotation of the two rotating bodies is the same, and spiral if the speed of rotation of the rotating bodies is not precisely the same. Any imperfection of any tooth of either intermeshing gear will obviously cause a temporary variation in speed of the two rotating bodies, one of which is driven in harmony with one of the intermeshing gears, while the speed of the other is dependent upon the intermeshing of the two gears. Such temporary variation in speed of rotation of the two rotating bodies, one of which influences the stylus supporting arm which is carried by the other, will produce a temporary departure of the stylus from the smooth, continuous line, and the character and location of such temporary departure, as recorded by the stylus upon the record sheet, will indicate the character and the location of the defect in the gears. Primarily intended to indicate and record only defects in the involute of each tooth, the machine incidentally indicates and records every variation from true concentricity of the gears. The machine which embodies the invention, in the form thus far found most satisfactory, is illustrated in the accompanying drawings in which—

Fig. 2 is a view of the machine in front elevation, partly in vertical section, to show details of construction.

Fig. 3 is a view in section on the vertical plane indicated by the broken line 3—3 of Fig. 1.

Figure 1:
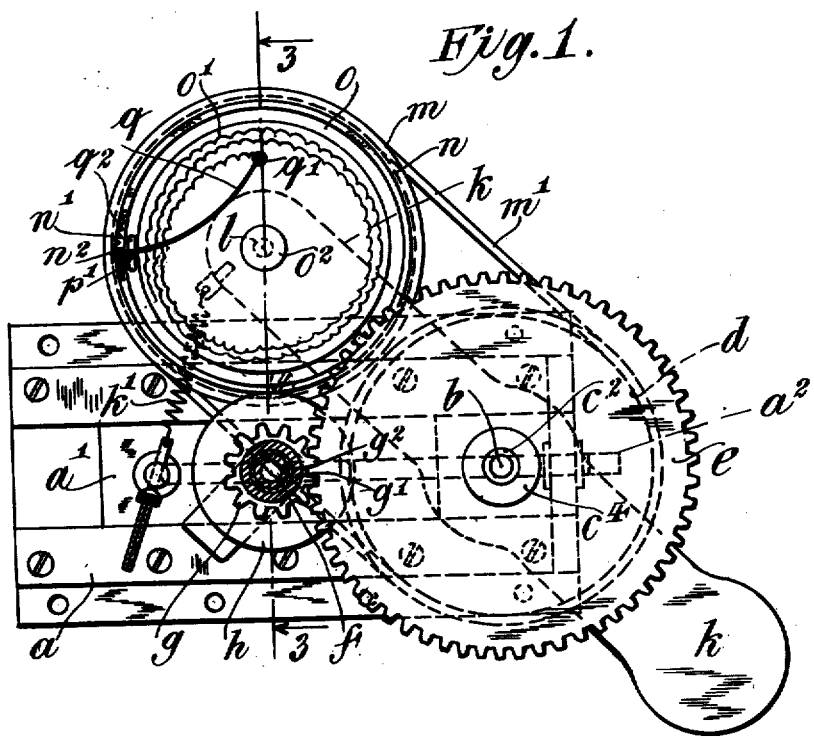
Figure 1 is a top view of the machine, partly in section, on the plane indicated by the broken line 1—1 of Fig. 2.
Figure 4:
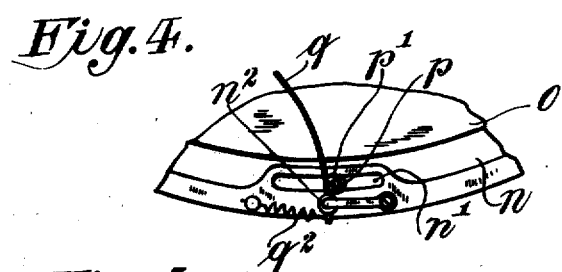
Figs. 4 and 5 are detail views on a larger scale illustrating particularly the relation of the stylus arm and its influencing finger.
Figure 5:
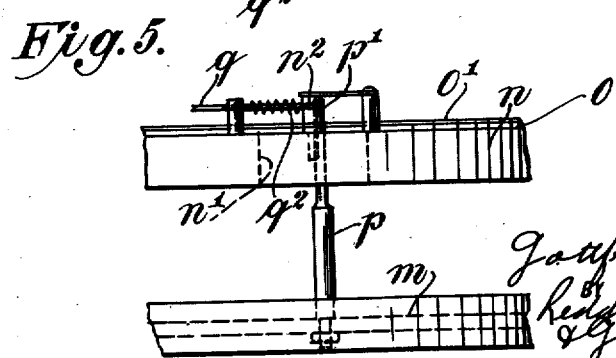

The mechanism which embodies the invention is represented in the drawings as mounted upon a base $a$ like the bed-plate of a gear cutting machine, provided with an adjustable carrier $a'$, and an adjusting screw $a^2$ to permit the change necessary to be made when gears of a different ratio are to be tested. In fixed position on the bedplate is secured a vertical spindle $b$, provided with a flange $b'$ and a threaded head $b^2$. On the spindle, resting on the threaded head $b^2$, is rotatably mounted a sleeve $c$, provided with a flange $c'$ and a threaded portion $c^2$. On the sleeve $c$, are secured, so as to rotate together, by means of suitable filling pieces $c^3$ and a nut $c^4$, a driving wheel, such as a band wheel $d$, preferably grooved as shown, and one of the gears $e$ of the pair to be tested. The rotation of the gear $e$ and the band wheel $d$, in the operation of the machine, is effected by the application of the hand to the gear wheel $e$.

On the adjustable block $a'$ of the base is fixed a vertical spindle $f$ (provided with an offset portion $f'$ to accommodate the swinging arm hereinafter referred to) and rotatably mounted on the spindle $f$, so as to rotate together, are the other gear $g$ of the pair to be tested and a friction wheel $h$. The gear $g$ to be tested is shown, in this instance, to be one of two gears on a sleeve $g'$ and the gear $g$ and friction disk $h$ are held upon the spindle $f$ so as to rotate together by the sleeve $g^2$ and nut $g^3$, the friction disk $h$ resting against the shoulder $f^2$, or rather, the washer $f^2$ which rests upon the offset portion $f'$. Mounted on the head $b^2$ of the spindle $b$, so as to swing freely thereon, is a counterbalanced supporting arm $k$ which carries at its free end a spindle $l$, the arm being pulled normally toward the spindle $f$ by a spring $k'$. On the spindle $l$ is rotatably mounted a band wheel $m$, rotated by a band $m'$ from the band wheel $d$ on the spindle $b$. Also mounted rotatably on the spindle $l$ is a friction disk $n$ for coöperation with the friction disk $h$. The ratio of the two friction disks $n$ and $h$ must be the same as the pitch ratio of the two gears $e$ and $g$, although the pitch diameters of the disks need not be the same as the pitch diameters of the two gears. Fixed on the spindle $l$, above the disk $n$, is a plate $o$ which carries the record sheet $o'$, the latter being held in position by a thumb screw $o^2$.

The band wheel $m$ or rotating body which, driven by the band $m'$ from the band wheel $d$, rotates in harmony with the gear $e$, carries a finger $p$ which projects upwardly through a peripheral slot $n'$ in the friction disk $n$ or rotating body which, being driven through the friction disk $h$, rotates in harmony with the other gear $g$ of the pair. The upper portion $p'$ of the finger $p$ is formed with a knife edge to bear against the stylus arm $q$, which is pivotally mounted at $n^2$ on the edge of the friction disk or rotating body $n$. The stylus arm $q$ carries at the free end of its longer arm a suitable stylus $q'$ and has connected to the shorter arm a spring $q^2$ for the purpose of keeping the stylus arm always in contact with the knife edge $p'$ of the finger $p$. The knife edge bears upon the arm close to the pivot so that any movement of the arm upon its pivot produced by the knife edge is multiplied greatly in the movement of the stylus.

It will be seen that in the operation of the machine rotary movement is imparted to the rotating body $m$ through the band wheel $m'$ and the band wheel $d$ in harmony with the rotation of the gear $e$ and that rotating movement is imparted to the rotating body $n$ from the gear $e$ through the gear $g$ and the friction disk $h$, the ratio of the friction disk or rotating body $n$ and the friction disk $h$ being the same as the ratio of the gears $e$ and $g$. If the gears are perfect and the two rotating bodies $m$ and $n$ rotate at precisely the same speed the position of the finger $p$ with respect to the pivot of the stylus arm $q$ will be unchanged and the stylus will therefore trace on the record sheet a smooth, continuous line, concentric with the common axis of the two rotating bodies $m$ and $n$. If the rotating body $m$ rotates slightly faster than the rotating body $n$ the stylus arm will be moved slightly on its pivot and the stylus will trace a smooth continuous line on an increasing spiral. If the rotating body $n$ rotates at a slightly slower speed than the rotating body $n$ the spiral will be decreasing. It will further be seen that any irregularity in the rotation of the gear $g$, caused by any irregularity in any tooth surface, will cause a corresponding irregularity in the movement of the rotating body $m$ with respect to the rotating body $n$. The stylus arm will therefore be influenced by the finger $p$ to cause the sylus to depart from the smooth, continuous line or perfectly circular or perfectly spiral line and the record of such movement on the record sheet will indicate the character and location of such defect in the toothed surface. In Fig. 1 of the drawing the line traced by the stylus is shown as indicating a defect in the involute surface of every tooth, but it will be understood that a defect in only one tooth would make a break in the regularity or contiguity of the line only at one point in the circle or in a complete turn of the spiral. It will be observed that it is of advantage to have the record line spiral rather than truly circular because it gives a better opportunity to check up defects.

Various changes in details of construction and arrangement may be made to suit different conditions of use without departing from the spirit of the invention.

I claim as my invention:

1. In a gear-testing machine, the combination of means to support rotatively and in mesh the gears to be tested, a driving wheel mounted to rotate with one of said gears, a rotating body driven by said driving wheel in harmony with said gear, a second rotating body, a friction disk secured to the other of said gears to rotate therewith and in frictional contact with the second rotating body, and indicating mechanism carried by one of said rotating bodies and influenced by the other of said rotating bodies.

2. In a gear-testing machine, the combination of means to support rotatively and in mesh the gears to be tested, a driving wheel secured to one of said gears to rotate therewith, a friction disk secured to the other of said gears to rotate therewith, two rotating bodies mounted concentrically and driven respectively by said driving wheel and said friction disk, and indicating mechanism carried by one of said rotating bodies and influenced by the other.

3. In a gear-testing machine, the combination of means to support rotatively and in mesh the gears to be tested, a driving wheel secured to one of said gears to rotate therewith, a friction disk secured to the other of said gears to rotate therewith, two rotating bodies mounted concentrically and driven respectively by said driving wheel and said friction disk, an indicating arm pivotally mounted on one of said rotating bodies, and an influencing finger carried by the other of said rotating bodies in operative relation with the indicating arm.

4. In a gear-testing machine, the combination of two spindles to support rotatively and in mesh the gears to be tested, a swinging arm mounted to swing about the axis of one of said gears, a rotating body carried by said swinging arm, devices whereby the rotating body is made to rotate in harmony with one of the gears, a second rotating body also carried by the swinging arm, devices whereby the second rotating body is made to rotate in harmony with the other of said gears, and indicating mechanism carried by one of said bodies and influenced by the other of said bodies.

5. In a gear-testing machine, the combination of two spindles to support rotatively and in mesh the gears to be tested, a driving wheel mounted to rotate with one of said gears, a swinging arm mounted concentrically therewith, a rotating body carried by said arm and driven by said driving wheel in harmony with said gear, a second rotating body mounted concentrically with the first rotating body, means to drive the second rotating body in harmony with the other of said gears, and indicating mechanism carried by one of said rotating bodies and influenced by the other of said rotating bodies.

6. In a gear-testing machine, the combination of two spindles to support rotatively and in mesh the gears to be tested, a driving wheel mounted to rotate with one of said gears, a swinging arm mounted concentrically therewith, a rotating body carried by said arm and driven by said driving wheel in harmony with said gear, a second rotating body mounted concentrically with the first rotating body, a friction disk secured to the other of said gears to rotate therewith and in frictional contact with the second rotating body and indicating mechanism carried by one of said rotating bodies and influenced by the other of said rotating bodies.

This specification signed this 24th day of August, 1917.

GOTTFRIED WIRRER.

It is hereby certified that in Letters Patent No. 1,282,348, granted October 22, 1918, upon the application of Gottfried Wirrer, for an improvement in "Gear-Testing Machines," an error appears requiring correction as follows: In the grant and the heading to the printed specification the residence of the patentee is erroneously written and printed as "Philadelphia, Pennsylvania," whereas said residence should have been written and printed as *Plainfield, New Jersey;* and that the said Letters Patent should be read with this correction therein that the same may conform to the record of the case in the Patent Office.

Signed and sealed this 26th day of November, A. D., 1918.

[SEAL.]

R. F. WHITEHEAD,
*Acting Commissioner of Patents.*

Cl. 234—1.